United States Patent [19]

Takahashi et al.

[11] Patent Number: 5,488,022
[45] Date of Patent: Jan. 30, 1996

[54] CATALYST COMPONENT FOR OLEFIN POLYMERIZATION

[75] Inventors: Tadashi Takahashi; Takashi Fujita; Kazuo Nakamura; Seiichi Tsukamoto, all of Yokkaichi, Japan

[73] Assignee: Mitsubishi Chemical Corporation, Tokyo, Japan

[21] Appl. No.: 139,805

[22] Filed: Oct. 22, 1993

[30] Foreign Application Priority Data

Oct. 28, 1992 [JP] Japan .................................. 4-290441

[51] Int. Cl.$^6$ ........................................ B01J 31/00
[52] U.S. Cl. ....................... 502/115; 502/112; 502/116; 502/117
[58] Field of Search ........................... 585/112, 115, 585/116, 117

[56] References Cited

U.S. PATENT DOCUMENTS

| | | | |
|---|---|---|---|
| 4,399,055 | 8/1983 | Matsuura et al. | 502/126 |
| 4,916,099 | 4/1990 | Sasaki et al. | 502/6 |
| 4,942,148 | 7/1990 | Furuhashi et al. | 502/115 |
| 4,972,034 | 11/1990 | Matsuura et al. | 502/116 |
| 5,032,563 | 7/1991 | Matsuura et al. | 502/112 |

*Primary Examiner*—Asok Pal
*Attorney, Agent, or Firm*—Oblon, Spivak, McClelland, Maier, & Neustadt

[57] ABSTRACT

A catalyst component for olefin polymerization which comprises an intimate mixture of: Component (A1) which is a solid component for Ziegler catalysts comprising titanium, magnesium and a halogen as essential components in a particulate form; and Component (A2) which is a compound selected from the group consisting of inorganic oxides, inorganic carbonates, inorganic sulfates and physical or chemical mixtures thereof in a particulate form; wherein Component (A2) is employed in a weight ratio to Component (A1) from 0.001 to 0.5 and has an average particle diameter smaller than that of Component (A1). The catalyst component may be of a structure such that the particulate inorganic material, Component (A2), adhere to or cover particles of a solid component of a Ziegler catalyst, whereby fluidity of the Ziegler catalyst component is improved.

13 Claims, No Drawings

CATALYST COMPONENT FOR OLEFIN POLYMERIZATION

BACKGROUND OF THE INVENTION

1. Field of the Art

The present invention relates to a particulate catalyst component for olefin polymerization having good granulometric properties such as fluidity or adhesion of particles.

Polymerization of olefins with a catalyst comprising the catalyst component of the present invention as a transition metal component and an organoaluminum compound as an organometallic component will enjoy improvements in the granulometric properties of the catalyst used such as fluidity and adhesion whereby it is made possible to conduct polymerization without the problems inherent in poor granulometric properties such as clogging of a catalyst inlet tube on introducing the catalyst or polymer adhesion which in turn arises from catalyst adhesion in a polymerization vessel and without problem of forming coarse polymer particles.

2. Related Art

Conventional handling methods of a catalyst for olefin polymerization include a method where the catalyst is diluted with an inert solvent or a method where the catalyst is handled in the dry state under inert gas atmosphere, the latter being preferred from the viewpoints of the stability of catalyst properties on storage and the ease in the handling of catalysts during their transportation.

However, a variety of problems in the properties of catalysts for olefin polymerization, such as poor fluidity or an angle of repose in particular, or tendency to adhere have heretofore been found during their handling in the form of dry powder.

Thus, a lot of methods have been proposed for solving the problems, but none of these methods would not be at the satisfactory levels.

The present inventors have proposed a method of improving the fluidity or the other properties of a particulate catalyst component, which method comprises adding true spherical polyethylene particles of an average particle diameter of from 30 to 2000 µm to a solid component comprising Ti, Mg and a halogen as the essential components (Japanese Patent Laid-Open Publication No. 217404/1991).

The method, which showed improvement in the effects of the catalyst components to some extents, however, was at such a level that the improvements attained could depend on the solid components used, and thus further improvements may be desirable.

The problems to be solved by the present invention are to improve granulometric properties of a particulate catalyst component for olefin polymerization such as fluidity, an angle of repose or adhesion of particles, whereby the present invention is to solve the various troubles during the manufacturing of olefin polymers such as the clogging of a catalyst inlet tube on introducing the catalyst, polymer adhesion arising from catalyst adhesion in a polymerization vessel or the formation of coarse polymer particles, by the use of the catalyst component of the present invention.

SUMMARY OF THE INVENTION

The present invention provides a catalyst component for olefin polymerization which comprises an intimate mixture of:

Component (A1) which is a solid component for Ziegler catalysts comprising titanium, magnesium and a halogen as the essential components in a particulate form; and Component (A2) which is a compound selected from the group consisting of inorganic oxides, inorganic carbonates, inorganic sulfates and physical or chemical mixtures thereof in a particulate form;

wherein Component (A2) is employed in a weight ratio to Component (A1) from 0.001 to 0.5 and has an average particle diameter smaller than that of the Component (A1).

DETAILED DESCRIPTION OF THE PRESENT INVENTION

The catalyst component according to the present invention comprises the combination of the following Components (A1) and (A2). The phraseology "comprises the combination" herein means in addition to the combination of the specifically described Components, i.e. (A1) and (A2), the combinations of these components with appropriate auxiliary components. The catalyst component forms a catalyst for olefin polymerization when combined with an organoaluminum component.

Component (A1)

Essential ingredients:

Component (A1) is a solid composition comprising titanium, magnesium and a halogen as the essential elements, which is usable in Ziegler catalysts as their solid component. Here, the wording "comprising as the essential components" indicates that it can also contain other elements suited for the purpose than the three components mentioned, that these elements can exist in any desired compound suited for the purpose respectively, and also that these elements can also exist in the form mutually bonded together. Solid components containing titanium, magnesium and a halogen are known per se. For example, those as disclosed in Japanese Laid-open Patent Publications Nos. 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984 and 149906/1984 may be employed.

Other examples of suitable solid compositions include derivatives of these solid compositions given above obtained by treating of the solid compositions with a compound of wolfram or molybdenum.

As the magnesium compound which is the magnesium source to be used in the present invention, magnesium dihalides, dialkoxymagnesiums, alkoxymagnesium halides, magnesium oxyhalides, dialkylmagnesiums, magnesium oxide, magnesium hydroxide, carboxylates of magnesium, etc. are exemplified. Among these magnesium compounds, magnesium dihalides, dialkoxymagnesiums and alkoxymagnesium halides, particularly $MgCl_2$, are preferred. The halogen in these halides is typically chlorine or bromine and the alkoxy in these alkoxide is typically a lower ($C_1$–$C_4$) alkoxy.

As the titanium compound which is the titanium source, compounds represented by the formula $Ti(OR^1)_{4-n}X_n$ (wherein $R^1$ is a hydrocarbyl group, preferably having about 1 to 10 carbon atoms, X represents a halogen atom and n is an integer of $0 \leq n \leq 4$) and polymers of a titanium tetraalkoxide. Specific examples may include:

titanium tetrahalides such as $TiCl_4$, and $TiBr_4$; alkoxytitanium halides such as
$Ti(OC_2H_5)Cl_3$,
$Ti(OC_2H_5)_2Cl_2$,
$Ti(OC_2H_5)_3Cl$,
$Ti(O-iC_3H_7)Cl_3$,
$Ti(O-nC_4H_9)Cl_3$,
$Ti(O-nC_4H_9)_2Cl_2$,
$Ti(OC_2H_5)Br_3$,
$Ti(OC_2H_5)(OC_4H_9)_2Cl$,
$Ti(O-nC_4H_9)_3Cl$,
$Ti(O-C_6H_5)Cl_3$,
$Ti(O-iC_4H_9)_2Cl_2$,
$Ti(OC_5H_{11})Cl_3$, and
$Ti(OC_6H_{13})Cl_3$;

and titanium tetraalkoxides such as
$Ti(OC_2H_5)_4$,
$Ti(O-iC_3H_7)_4$,
$Ti(O-nC_3H_7)_4$,
$Ti(O-nC_4H_9)_4$,
$Ti(O-iC_4H_9)_4$,
$Ti(O-nC_5H_{11})_4$,
$Ti(O-nC_6H_{13})_4$,
$Ti(O-nC_7H_{15})_4$,
$Ti(O-nC_8H_{17})_4$,
$Ti[OCH_2CH(CH_3)_2]_4$, and
$Ti[OCH_2CH(C_2H_5)C_4H_9]_4$.

Polymers of a titanium tetraalkoxide may include those represented by the following formula:

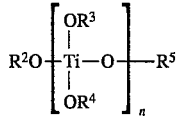

wherein, $R^2-R^5$ represent the same or different hydrocarbyl groups, preferably aliphatic hydrocarbyl group having 1 to 10 carbon atoms or aromatic hydrocarbyl groups, particularly aliphatic hydrocarbyl groups having 2 to 6 carbon atoms. n represents a number of 2 or more, particularly a number up to 20. The value of n should be desirably selected so that the polytitanate itself or as a solution can be provided in a liquid state for the contact step with other components. A suitable n selected in view of ease of handling may be about 2 to 14, preferably 2 to 10. Specific examples of such polytitanates may include n-butylpolytitanate (n=2 to 10), hexylpolytitanate (n=2 to 10), n-octylpolytitanate (n=2 to 10), and the like. Among them, n-butylpolytitanate is preferred.

It is also possible to use, as the titanium compound for the titanium source, a molecular compound obtained by reacting an electron donor as described below with a compound $TiX'_4$ (where $X'$ represents a halogen). Specific examples may include:

$TiCl_4 \cdot CH_3COC_2H_5$,
$TiCl_4 \cdot CH_3CO_2C_2H_5$,
$TiCl_4 \cdot C_6H_5NO_2$,
$TiCl_4 \cdot CH_3COCl$,
$TiCl_4 \cdot C_6H_5COCl$,
$TiCl_4 \cdot C_6H_5CO_2C_2H_5$,
$TiCl_4 \cdot ClCOC_2H_5$, and
$TiCl_4 \cdot C_4H_4O$.

Among these titanium compounds, $TiCl_4$, $Ti(OEt)_4$, $Ti(OBu)_4$, and $Ti(O-Bu)Cl_3$ are preferred. Particularly, $TiCl_4$ and $Ti(O-Bu)_4$ are preferred. Et and Bu of course indicate $C_2H_5$ and $C_4H_9$, respectively.

Another group of titanium compounds usable in the present invention consists of those expressed by a formula: $Ti(OR^6)_{3-p}X_p$ where $R^6$ represents a hydrocarbyl, preferably having 1 to 10 carbon atoms, X represent a halogen atom, and p is an integer of $0 < p \leq 3$, wherein particular examples include $TiCl_3$, $TiBr_3$, $Ti(OCH_3)Cl_2$ and $Ti(OC_2H_5)Cl_2$.

Still another group of titanium compounds usable in the present invention consists of tilanocene compounds including dicyclopentadienyltitanium dichloride, dicyclopentadienyltitanium dimethyl and bisindenyltitanium dichloride.

As to the halogen source, it is a common practice to supply the halogen from the halide compounds of magnesium and/or titanium as described above, but it can be also supplied from other halogen source such as halogen compounds of aluminum, halogen compounds of silicon, and halogen compounds of phosphorus, which are known in Ziegler catalyst technology as a halogenating agent.

Esters used as electron donor compounds as described hereinbelow in more detail can be used as the halogen source when the esters are used in the form of acylhalides such as phthalic chloride in place of a phthalate ester. The halogen contained in the catalyst components may be fluorine, chlorine, bromine, iodine or a mixture of these, particularly preferably chlorine. Optional ingredients (No. 1):

Further, in preparing the solid component, use can also be made of an electron donor as what is called "an inside donor".

Examples of the electron donor or the inside donor which can be used for preparation of the solid component may include oxygen-containing electron donors such as alcohols, phenols, ketones, aldehydes, carboxylic acids, esters of an organic acid or an inorganic acid, ethers, acid amides, acid anhydrides, and the like; and nitrogen-containing electron donors such as ammonia, amines, nitriles, isocyanates, and the like.

More specifically, there may be included:

(a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol, isopropylbenzyl alcohol and the like;

(b) phenols having 6 to 25 carbon atoms which may or may not have an alkyl group, such as phenol, cresol, xylenol, ethylphenol, propylphenol, cumylphenol, nonylphenol, naphthol and the like;

(c) ketones having 3 to 15 carbon atoms, such as acetone, methyl ethyl ketone, methyl isobutyl ketone, acetophenone, benzophenone and the like;

(d) aldehydes having 2 to 15 carbon atoms, such as acetaldehyde, propionaldehyde, octylaldehyde, benzaldehyde, tolualdehyde, naphthaldehyde and the like;

(e) organic acid esters having 2 to 20 carbon atoms, such as methyl formate, methyl acetate, ethyl acetate, vinyl acetate, propyl acetate, octyl acetate, cyclohexyl acetate, cellosolve acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, cellosolve benzoate, methyl toluate, ethyl toluate, amyl toluate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarine, phthalide, ethylene carbonate, cellosolve acetate, cellosolve isobutyrate and cellosolve benzoate, etc.;

(f) inorganic acid esters, such as silicates such as ethyl silicate, butyl silicate, phenyl-triethoxysilane, etc.;

(g) acid halides having 2 to 15 carbon atoms, such as acetyl chloride, benzoyl chloride, toluoyl chloride, anisoyl chloride, phthaloyl chloride, phthaloyl isochloride and the like;

(h) ethers having 2 to 20 carbon atoms, such as methyl ether, ethyl ether, isopropyl ether, butyl ether, amyl ether, tetrahydrofuran, anisole, diphenyl ether and the like;

(i) acid amides, such as acetamide, benzamide, toluamide and the like;

(j) amines, such as monomethylamine, monoethylamine, diethylamine, tributylamine, piperidine, tribenzylamine, aniline, pyridine, picoline, tetramethylethylenediamine and the like; and (k) nitriles, such as acetonitrile, benzonitrile, tolunitrile and the like. One or more of these electron donors can be used in preparing the solid catalyst component.

Among them to be preferably used when stereoregulation is required in polymerization of an olefin of 3 or more carbon atoms, typically polymerization of propylene, preferred are organic acid esters and acid halides, particularly preferably phthalic acid esters, phthalic acid halides, and cellosolve acetate.

Compositional proportion:

The amounts of the above respective components used may be at any desired level, so long as the advantages inherent in the present invention can be attained, but, generally speaking, the following ranges are preferred.

The amount of the titanium compound used may be within the range of $1 \times 10^{-4}$ to 1,000, preferably 0.01 to 10, in terms of molar ratio relative to the amount of the magnesium compound used. When a compound as the halogen source is used, its amount used may be within the range of $1 \times 10^{-2}$ to 1,000, preferably 0.1 to 100, in terms of a molar ratio relative to magnesium used, irrespective of whether the titanium compound and/or the magnesium compound may contain a halogen or not.

The amount of the electron donor compound when used may be within the range of $1 \times 10^{-3}$ to 10, preferably 0.01 to 5, in terms of a molar ratio relative to the amount of the above magnesium compound used.

Preparation of Component (A1):

The solid component Component (A1), may be prepared from the titanium source, the magnesium source and the halogen source, and further optionally other components such as an electron donor according to methods mentioned below.

(a) A method in which a magnesium halide optionally together with an electron donor is contacted with a titanium compound.

(b) A method in which alumina or magnesia is treated with a phosphorus halide compound, and the product is contacted with a magnesium halide, an electron donor, a halide-containing compound of titanium.

(c) A method in which a solid component obtained by contacting a magnesium halide with a titanium tetraalkoxide and a specific polymeric silicon compound is contacted with a titanium halide compound and/or a silicon halide compound.

As the polymeric silicon compound, those represented by the following formula are suitable:

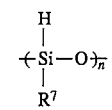

wherein $R^7$ is a hydrocarbyl group having about 1 to 10 carbon atoms, n is a polymerization degree such that the viscosity of the polymeric silicon compound may be 1 to 100 centistokes.

Among them, methylhydrogenpolysiloxane, ethylhydrogenpolysiloxane, phenylhydrogenpolysiloxane, cyclohexylhydrogenpolysiloxane, 1,3,5,7-tetramethylcyclotetrasiloxane, and 1,3,5,7,9-pentamethylcyclopentasiloxane, are preferred.

(d) A method in which a magnesium compound is dissolved in a titanium tetraalkoxide and an electron donor, a halogenating agent or a titanium halide compound is added to the solution thereby to precipitate a solid component and the precipitate is then contacted with a titanium compound. Examples of halogenating agents include silicon halides, aluminium halides, and halogen compounds of phosphorus.

(e) A method in which an organomagnesium compound such as Grignard reagent is reacted with a halogenating agent, or a reducing agent, and then the reaction product is contacted with an electron donor and a titanium compound.

(f) A method in which an alkoxymagnesium compound is contacted with a halogenating agent and/or a titanium compound in the presence or absence of an electron donor.

(g) A method which is a modification of either one of the above methods in that an optional component, which will be described hereinbelow, is present.

Among these methods, method (c), (d) and (g) are preferable.

Contact temperature is in the range from −50 to ca. 200, preferably from 0 to ca. 100. The contact may be practiced by a mechanical method with a rotary ball mill, a vibration mill, or a jet mill, in the presence or absence of an inert diluent or by contacting the ingredients in the presence of an inert diluent.

As the inert diluent in that case, hydrocarbons, halogenated hydrocarbons, polysiloxanes, or dialkylsiloxanes may be exemplified. Examples of hydrocarbons may include hexane, heptane, toluene, cyclohexane and the like; examples of halogenated hydrocarbons include n-butyl chloride, 1,2-dichloroethylene, carbon tetrachloride, chlorobenzene, etc.; and examples of dialkylpolysiloxane include dimethylpolysiloxane, methylphenylpolysiloxane and the like.

In these contact operations, components such as methylhydrogen polysiloxane, ethyl borate, aluminum triisopropoxide, aluminum trichloride, silicon tetrachloride, a tetravalent titanium compound or a trivalent titanium compound may also be present together with the aforementioned components unless these components do not impair the effect of the present invention (explained partly hereinabove and partly hereinafter in detail).

Component (A1), a solid component for Ziegler catalysts containing titanium, magnesium and a halogen as essential components is thus obtained.

Optional ingredient (No. 2):

Component (A1) employed in the present invention, which comprises the above described essential components (Ti, Mg and a halogen) and may contain an electron donor as an optional component as described above, may upon necessity further contain the following optional components.

Component (A1) may upon necessity contain additional components, for example a silicon compound such as $SiCl_4$, and $CH_3SiCl_3$; a polymeric silicon compound having the structure represented by the following formula:

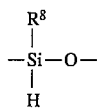

(wherein $R^8$ is a hydrocarbyl group having about 1 to 10, particularly about 1 to 6 carbon atoms) and having a viscosity of about 1 centistoke to 100 centistokes, such as methylhydrogenpolysiloxane, ethylhydrogenpolysiloxane, phenylhydrogenpolysiloxane, cyclohexylhydrogenpolysiloxane, 1,1,3,3-tetramethyldisiloxane, 1,3,5,7-tetramethylcyclotetrasiloxane, and 1,3,5,7,9-pentamethylcyclopentasiloxane; an aluminum compound such as $Al(OiC_3H_7)_3$, $AlCl_3$, $AlBr_3$, $Al(OC_2H_5)_3$, $Al(OCH_3)_2Cl$; a boron compound such as $B(OCH_3)_3$, $B(OC_2H_5)_3$, $B(OC_6H_5)_3$; a wolfram compound such as $WCl_6$, $WCl_5$ and $WI_5$; and molybdenum compound such as $MoCl_5$ and $MoBr_5$.

These optional compounds may remain in the solid component as the components of silicon, aluminum and boron.

As the silicon compound, there may be mentioned in addition to the above described compounds those represented by the following formula:

$$R^9R^{10}{}_{3-r}Si(OR^{11})_r$$

wherein $R^9$ represents a branched hydrocarbyl group, $R^{10}$ represents a hydrocarbyl group which may be the same as or different from $R^9$, $R^{11}$ represents a hydrocarbyl group, and r denotes a number of $1 \leq r \leq 3$.

$R^9$ is preferably a hydrocarbyl group having a branch at the carbon atom adjacent to the silicon atom. In this case, the branch is preferably an alkyl group, a cycloalkyl group or an aryl group (e.g. a phenyl group or a methyl substituted phenyl group). $R^9$ is more preferably a hydrocarbyl group in which the carbon atom adjacent to the silicon atom, i.e. the α-carbon atom, is a secondary or tertiary carbon atom, more preferably the one in which the carbon atom adjacent to the silicon atom is a tertiary carbon atom. $R^9$ may preferably contain from 3 to 20, more preferably from 4 to 10 carbon atoms. $R^{10}$ may preferably be a branched or straight chain aliphatic hydrocarbyl group having from 1 to 20 carbon atoms, preferably from 1 to 10 carbon atoms. $R^{11}$ may preferably be an aliphatic hydrocarbyl group, more preferably a straight chain aliphatic hydrocarbyl group having from 1 to 4 carbon atoms. The silicon compound may upon necessity be a mixture of two or more of the compounds represented by the above described formula. The silicon compound is preferably employed for the preparation of a catalyst component used for the polymerization of an α-olefin having at least 3 carbon atoms in which stereoregular polymerization plays a significant role, particularly the polymerization of propylene. The silicon compound and the electron donor compound of the aforementioned Optional ingredient (No. 1) are used independently or as a mixture thereof.

Specific examples of the silicon compound used in the present invention include:

$(CH_3)_3CSi(CH_3)(OCH_3)_2$,
$(CH_3)_3CSi(CH(CH_3)_2)(OCH_3)_2$,
$(CH_3)_3CSi(CH_3)(OC_2H_5)_2$,
$(C_2H_5)_3CSi(CH_3)(OCH_3)_2$,
$(CH_3)(C_2H_5)CHSi(CH_3)(OCH_3)_2$,
$((CH_3)_2CHCH_2)_2Si(OCH_3)_2$,
$(C_2H_5)(CH_3)_2CSi(CH_3)(OCH_3)_2$,
$(C_2H_5)(CH_3)_2CSi(CH_3)(OC_2H_5)_2$,
$(CH_3)_3CSi(OCH_3)_3$,
$(CH_3)_3CSi(OC_2H_5)_3$,
$(C_2H_5)_3CSi(OC_2H_5)_3$,
$(CH_3)(C_2H_5)CHSi(OCH_3)_3$,
$(C_2H_5)(CH_3)_2CSi(OCH_3)_3$,
$(C_2H_5)(CH_3)_2CSi(OC_2H_5)_3$,
$(CH_3)_3CSi(O\text{-}tC_4H_9)(OCH_3)_2$,
$(iC_3H_7)Si(OCH_3)_2$,
$(iC_3H_7)Si(OC_2H_5)_2$,
$(C_6H_{11})Si(CH_3)(OCH_3)_2$,
$(C_6H_{11})_2Si(OCH_3)_2$,
$(C_6H_{11})(iC_4H_9)Si(OCH_3)_2$,
$(iC_4H_9)(secC_4H_9)Si(OCH_3)_2$,
$(iC_4H_9)(iC_3H_7)Si(OC_5H_{11})_2$,
$(C_5H_9)_2Si(OCH_3)_2$,
$(C_5H_9)_2Si(OC_2H_5)_2$,
$(C_5H_9)(CH_3)Si(OCH_3)_2$,
$(C_5H_9)(iC_4H_9)Si(OCH_3)_2$,

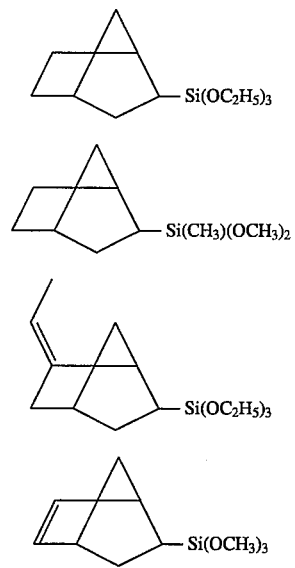

Among these compounds are preferred those having a branched chain hydrocarbyl group as $R^9$ which has, as the α-carbon, a secondary or tertiary carbon atom and has from 3 to 20 carbon atoms, particularly those having a branched chain hydrocarbyl group as $R^9$ which has, as the α-carbon, a tertiary carbon atom and has from 4 to 10 carbon atoms.

Furthermore, in the present invention, an organometallic compound in the I-III Groups of the Periodic Table can be also used, if necessary.

This compound, since it is an organometallic compound, has at least one organic group-metal bond. The organic group in this case typically includes a hydrocarbyl group having 1-ca. 10, preferably 1-ca. 6 carbon atoms. The metal in this compound typically includes lithium, magnesium, aluminum and zinc, particularly aluminum.

The balance of the valence of the metal in the organometallic compound in which at least one of the valences of the metal is satisfied with the organic group, if any, is satisfied with a hydrogen atom, a halogen atom, a hydrocarbyloxy groups (having 1-ca. 10, preferably 1-ca. 6 carbon atoms) or a group which has the metal in question with an oxygen atom intervening therebetween such as —O—Al(CH$_3$)— in the case of methylalumoxane.

Examples of the organometallic compounds include (a) organolithium compounds such as methyllithium, n-butyllithium and tert-butyllithium;

(b) organomagnesium compounds such as butylethylmagnesium, dibutylmagnesium, hexylethylmagnesium, butylmagnesium chloride and tert-butylmagnesium bromide;

(c) organozinc compounds such as diethylzinc and dibutylzinc; and (d) organoaluminum compounds such as trimethylaluminum, triethylaluminum, triisobutylaluminum, tri-n-hexylaluminum, diethylaluminum chloride, diethylaluminum hydride, diethylaluminum ethoxide, ethylaluminum sesquichloride, ethylaluminum dichloride and methylalumoxane. Among these compounds, the organoaluminum compounds are preferred. Further examples of the organoaluminum compounds may be found in examples of organoaluminum compounds as the Component (B) described hereinafter.

Furthermore, vinylsilane compounds can also be used as an optional ingredient. There can be mentioned specifically substituted monosilane compounds in which at least hydrogen atom in monosilane (SiH$_4$) is replaced with vinyl (CH$_2$=CH—) and some of the remaining hydrogen atoms are replaced with halogen atom (preferably Cl), an alkyl (preferably having 1–12 carbon atoms, more preferably having 1–4 carbon atoms), an alkoxy (preferably having 1–12 carbon atoms, more preferably having 1–4 carbon atoms) or an aryl (preferably phenyl), whose examples include CH$_2$=CH—SiH$_3$,
CH$_2$=CH—SiH$_2$(CH$_3$),
CH$_2$=CH—SiH(CH$_3$)$_2$,
CH$_2$=CH—Si(CH$_3$)$_3$,
CH$_2$=CH—SiCl$_3$,
CH$_2$=CH—SiCl$_2$(CH$_3$),
CH$_2$=CH—SiCl(CH$_3$)H,
CH$_2$=CH—SiCl(C$_2$H$_5$)$_2$,
CH$_2$=CH—Si(C$_2$H$_5$)$_3$,
CH$_2$=CH—Si(CH$_3$)(C$_2$H$_5$)$_2$,
CH$_2$=CH—Si(C$_6$H$_5$)(CH$_3$)$_2$,
CH$_2$=CH—Si(CH$_3$)$_2$(C$_6$H$_4$CH$_3$),
CH$_2$=CH—Si(OCH$_3$)$_3$,
CH$_2$=CH—Si(OC$_2$H$_5$)$_3$,
CH$_2$=CH—Si(C$_2$H$_5$)(OCH$_3$)$_2$,
CH$_2$=CH—Si(OC$_2$H$_5$)$_2$H,

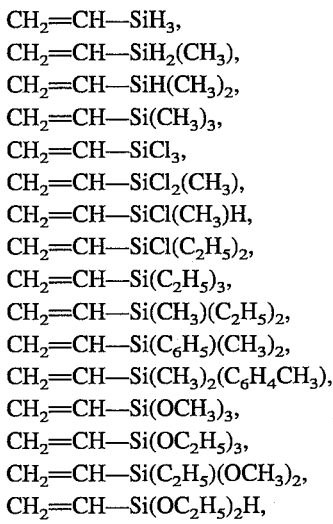

(CH$_2$=CH)(CH$_3$)$_2$—Si—O—Si(CH$_3$)$_2$(CH=CH$_2$),
(CH$_2$=CH)$_2$SiCl$_2$, and (CH$_2$=CH)$_2$Si(CH$_3$)$_2$.

Among these, vinylsilanes free of an oxygen atom are preferable, vinylalkylsilanes and vinylhaloalkylsilanes are more preferable.

Optional ingredient (No. 3):

During or after the course of preparation of the Component (A1) of the present invention, an ethylenically unsaturated compound such as an olefin or a diene compound may upon necessity be employed as an optional component. Examples of the ethylenically unsaturated compound include those having 2–20 carbon atoms such as ethylene, propylene, 1-butene, 2-butene, isobutene, 1-pentene, 2-pentene, 2-methyl-1-butene, 3-methyl-1-butene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-ethyl-1-butene, 2,3-dimethyl-1-butene, 3,3-dimethyl-1-butene, 2,3-dimethyl-2-butene, 1-heptene, 1-octene, 2-octene, 3-octene, 4-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, styrene, α-methylstyrene, divinylbenzene, 1,2-butadiene, isoprene, hexadiene, 1,4-hexadiene, 1,5-hexadiene, 1,3-pentadiene, 1,4-pentadiene, 2,3-pentadiene, 2,6-octadiene, cis-2, trans-4-hexadiene, trans-2, trans-4-hexadiene, 1,2-heptadiene, 1,4-heptadiene, 1,5-heptadiene, 1,6-heptadiene, 2,4-heptadiene, dicyclopentadiene, 1,3-cyclohexadiene, 1,4-cyclohexadiene, cyclopentadiene, 1,3-cycloheptadiene, 1,3-butadiene, 4-methyl-1,4-hexadiene, 5-methyl-1,4-hexadiene, 1,9-decadiene, and 1,13-tetradecadiene.

These ethylenically unsaturated compounds are generally polymerized when they are in contact with the Component (A1) and, if necessary, an organoaluminum compound, and the Component (A1) thus prepared is regarded as one having undergone the so-called preliminary polymerization. The amount of the ethylenically unsaturated monomer used and polymerized in the preliminary polymerization is preferably 0.01 to 100, more preferably 0.1 to 10, expressed in terms of weight ratio to Component (A1).

Polymerization of an olefin with use of the Component (A1) which has undergone the preliminary polymerization has the advantages that heat evolution per catalyst particle will be reduced whereby removal of polymerization heat will be made easier, leading to effective prevention of formation of polymer chunks especially in a gas phase polymerization. The Component (A1) which has undergone the preliminary polymerization generally has a particle diameter larger than that of the Component (A1) which has not been subjected to the preliminary polymerization, and the above described ratio of the particle diameters of Component (A1) to Component (A2) thus should be regarded as the one based on the particle diameter after the preliminary polymerization.

Compositional proportion in Component (A1) and preparation thereof (bis)

As described hereinabove, silicon, aluminum, boron, tungsten and molybdenum compounds, respectively, are used in an amount from $1 \times 10^{-3}$ to 100 mole, preferably from 0.01 to 10 mole to the amount of the magnesium compound.

The aforementioned alkoxysilicon compound and the organometallic compound are specifically described as follows.

That is, the alkoxysilicon compound and the organometallic compound, which may be optionally used as far as some effects are observed, is preferably used at an amount in the following range:

The silicon compound may be used in a proportion from 0.01 to 1,000, preferably from 0.1 to 100, in the atomic ratio of silicon to the titanium component constituting Component (A1), silicon/titanium.

The organometallic compound is used in a proportion from 0.01 to 100, preferably from 0.1 to 30, in the ratio of the metal atom of the organometallic compound to the titanium component constituting Component (A1), metal/titanium.

These optional ingredient (No. 2) can be introduced during any steps of the preparation of Component (A1), and one of such procedures is, as described above, the introduction of the optional component (No. 2) during the process for preparing Component (A1) from its essential ingredients and, if necessary, an electron donor (optional ingredients (No. 2)).

In addition, the aforementioned vinylsilane compound may be used in a proportion from 0.001 to 1,000, preferably from 0.01 to 100, in the atomic ratio of silicon to the titanium component constituting Component (A1), silicon/titanium.

Furthermore, the ethylenically unsaturated compound as the optional ingredient, which is considered to polymerize during the preparation of Component (A1) as described hereinabove, may be used in a proportion from 0.01 to 100, preferably from 0.1 to 10, to that of Component (A1) before use of the ethylenically unsaturated compounds.

Component (A2)

The Component (A2) used in the present invention is a compound which is particulate and selected from the group consisting of an inorganic oxide, a carbonate, sulfate and a physical or chemical mixture thereof.

The terminology "physical mixture" used herein means a mechanical mixture of two or more compounds, and the terminology "chemical mixture" used herein means a state where the mixture can be considered to form a single compound from the members of mixture in question as in the case of a compound oxide formed from two or more oxides or the case where an oxide mixture can be construed to form a metal salt of an oxygen acid of a metal where the first metal has come from one member oxide and the latter metal has come from another member oxide in the oxide mixture, such as barium titanate. It is to be understood that a mixture of an intermediate nature between the physical mixture and the chemical mixture such as silica-alumina in which the ratio of these oxides is not necessarily defined stoichiometrically is also classified into either one of these mixtures and thus constitutes an embodiment of Component (A2) of the present invention.

Component (A2) used in the present invention can be used in the form of the primary particles, it is also possible to use the component in the form of the secondary or tertiary particles formed by the agglomeration of the primary particles.

The elements constituting these compounds include, in addition to the aforementioned silicon, metals such as alkali metals, alkaline earth metals, zinc, aluminum, titanium, zirconium and tungsten, and the compounds other than those having an excessively high alkalinity and/or solubility in water are preferably used in the present invention. Any of these compounds can be used as Component (A2) as far as the advantages inherent in the present invention can be observed, and examples include $TiO_2$, $SiO_2$, $Al(OH)_3$, $Al_2O_3$, $CaCO_3$, $MgCO_3$, $Al_2O_3 \cdot 4SiO_2 \cdot H_2O$, $Al_2O_3 \cdot 2SiO_2 \cdot 2H_2O$, $Al_2O_3 \cdot 2SiO_2$, $3MgO \cdot 4SiO_2 \cdot H_2O$, $3CaO \cdot Al_2O_3 \cdot 3CaSO_4 : 31H_2O$, $SiO_2 \cdot nH_2O$, $BaSO_4$, $Al_2SiO_5$, $3CaO \cdot SiO_2$, $Ba_2SiO_4$, $Al_2O_3 \cdot Na_2O \cdot 6SiO_2$, $Al_2O_3 \cdot CaO \cdot 2SiO_2$, $Cd_2SiO_4$, $BaTiO_3$, $ZrO_2$, and zeolite, preferably zeolite, $Al_2O_3$, $TiO_2$, $SiO_2$ and $ZrO_2$, more preferably $TiO_2$ and $ZrO_2$.

Component (A2) may be of any granulometric properties as far as the advantages inherent in the present invention is observed. Accordingly, Component (A2) having any shapes of a spherical or an indefinite shape can be used. As for the particle size, Component (A2) preferably used is the one having a smaller primary particle diameter, and the average primary particle diameter is preferably in the range of 1 μm or less, more preferably in the range of 0.1 μm or less. The primary particles agglomerate into secondary or tertiary particles, which are required to have a particle diameter smaller than that of Component (A1) used in the present invention. Furthermore, Component (A2) has an average particle diameter such that it is in a proportion to the average particle diameter of Component (A1) of preferably from 0.0001 to 0.5, more preferably from 0.0005 to 0.1. Although the reason still remains ambiguous, it is presumed that Component (A2) is required to be adsorbed onto the particle surface of Component (A1).

The average particle diameter of Component (A1) is determined by a sedimentation method where heptane is used as a dispersant using an apparatus for determination of a particle size distribution by means of light transmittance, Model SKN-1000, manufactured by SEISHIN MICRON PHOTOSIZER.

The average particle size of Component (A2) is determined by an electron microscope on the particle size of particles in the same direction and the average of the particle sizes is used as the average particle size of Component (A2).

Preparation of the Catalyst Component (A)

The catalyst component of the present invention, Catalyst Component (A), comprises Components (A1) and (A2), as described above. Catalyst Component (A) can be obtained by blending Components (A1) and (A2), which have been prepared separately. Component (A2) is employed in a weight ratio to Component (A1) of from 0.001 to 0.5, preferably from 0.005 to 0.1. The components (A1) and (A2) can be blended in any methods as far as the advantages inherent in the present invention is observed. The methods of blending these Components (A1) and (A2) include the blending under the atmosphere of an inert gas (particularly the thoroughly purified one) such as nitrogen gas or in the presence of an inert solvent such as a hydrocarbon solvent, for example hexane, and heptane. The blending of previously prepared Component (A1) and Component (A2) will result in the state such that particulate Component (A2) adheres to or cover particles of Component (A1).

These Components are blended by any suitable means including a blending method under stirring, a blending method with a mill such as a vibration mill or a rotary ball mill, a blending method in a shaker. The blending is conducted for a period from 1 minute to 100 hours, preferably from 5 minutes to about 10 hours.

Use of Catalyst/Polymerization of olefins

Catalysts for olefin polymerization will be made up by combining an intimate mixture of Components (A1) and (A2) with an organoaluminum compound.

Formation of Catalyst:

The catalyst employed in the present invention can be prepared by bringing the intimate mixture of Components (A1) and (A2), Catalyst Component (A), into contact with an organoaluminum compound, Catalyst Component (B), and if necessary, with a third component such as, e.g., an electron donor compound as a so-called external donor, in one portion, stepwise or in several portions, in the presence or absence of an olefin to be polymerized, within or outside a polymerization vessel.

Examples of the organoaluminum compounds as Catalyst Component (B) include (a) trialkylaluminums such as trimethylaluminum, triethylaluminum, triisobutylaluminum, trihexylaluminum, trioctylaluminum and tridecylaluminum;

(b) alkylaluminum halides such as diethylaluminum monochloride, diisobutylaluminum monochloride, ethylaluminum sesquichloride and ethylaluminum dichloride;

(c) alkylaluminum hydrides such as diethylaluminum hydride and diisobutylaluminum hydride;

(d) aluminum alkoxides such as diethylaluminum ethoxide and diethylaluminum phenoxide.

These organoaluminum compound (a)–(d) can upon necessity be used in combination with an alkylaluminum alkoxide represented by the formula: $R^{12}_{3-v}Al(OR^{13})_v$, in which $1 \leq v \leq 3$, and $R^{12}$ and $R^{13}$ may be the same or different and represent a hydrocarbyl group having 1–about 20 carbon atoms. Examples of the combinations include those of triethylaluminum and diethylaluminum ethoxide, diethylaluminum monochloride and diethylaluminum ethoxide, ethylaluminum dichloride and ethylaluminum diethoxide, and triethylaluminum, diethylaluminum ethoxide and diethylaluminum chloride.

The organoaluminum compound is employed in a weight ratio of the organoaluminum compound/the Catalyst Component (A) from 0.1 to 1,000, preferably from 1 to 100.

The process for preparing an olefin polymer according to the present invention comprises contacting an α-olefin by a catalyst comprising the combination of Catalyst Component (A) and Catalyst Component (B) described above, thereby to polymerize the α-olefin.

Polymerization Mode:

The process for preparing the polymer according to the present invention may be conducted in a batch-wise, continuous or semi-batch-wise way. More particularly, a method where a monomer itself is used as a solvent, a method where a gaseous monomer is used without solvent, and a method which is a hybrid of the two methods given can be mentioned as typical examples.

Preferable methods include one where a gaseous monomer is used without solvent, for example, a method where a fluidized bed of resulting polymer particles is formed by monomer stream, or a method where resulting polymer particles are agitated by a stirrer in a monomer atmosphere in a polymerization vessel.

Olefin Monomer and Resulting Polymer:

Olefins to be polymerized by the catalyst system of the present invention are represented by the general formula: $R^{14}—CH=CH_2$, in which $R^{14}$ represents a hydrogen atom or a hydrocarbyl group having 1–10 carbon atoms, which may be of a linear or branched structure. Specific examples of the olefins include ethylene, propylene, butene-1, pentene-1, hexene-1, and 4-methylpentene-1, preferably ethylene and propylene. When ethylene is polymerized, one or more of the aforementioned olefins can be copolymerized with ethylene in a proportion of up to 50% by weight, preferably up to 20% by weight of ethylene, and when propylene is polymerized, one or more of the olefins, preferably ethylene, can be copolymerized with propylene in a proportion of up to 30% by weight of propylene. These olefins, preferably ethylene and propylene, can be also copolymerized with another copolymerizable monomer such as vinyl acetate or a diolefin.

Typical examples of the polymers obtained by the present invention include (a) homopolymers of monomers such as ethylene or propylene;

(b) random copolymers of ethylene and propylene, ethylene and butene-1, ethylene and hexene-1, ethylene and octene-1, propylene and butene-1, and propylene and hexene-1;

(c) block copolymers of propylene and ethylene, and of propylene and ethylene/propylene.

Polymerization Conditions:

Polymerization may generally be conducted at a temperature from 30° C. to 150° C., preferably from 50° C. to about 100° C. at a polymerization pressure in the range from 1 to 50 kg/cm².G. In this connection, it is also possible to control MFR of the resultant polymers by a molecular weight modifier such as hydrogen, if necessary.

EXAMPLES

The fluidity of the particulate solid catalyst components in the following examples were determined by introducing 14 cc of the particulate solid catalyst component into stainless steel funnel having a cone angle of 30° having an outlet at the tip of the conical vessel to flow therethrough, where the size of an orifice is 3 mmφ, 5 mmφ, 6.5 mmφ, 8 mmφ or 12 mmφ. The fluidity is expressed by the minimum size of the orifice of the funnel through which the particulate solid catalyst runs out within 15 seconds, and ranked as shown in the Table below.

| Filter pore size | Fluidity |
| --- | --- |
| 3 mmφ | very good |
| 5 mmφ | fairly good |
| 6.5 mmφ | good |
| 8 mmφ | good as a whole |
| 12 mmφ | sufficient |
| no fluidity | insufficient |

<Example 1>

[Preparation of Component (A1)]

Into a flask which had been thoroughly purged with nitrogen, 500 ml of dehydrated and deoxygenated n-heptane was introduced, followed by 0.4 mole of $MgCl_2$ and 0.8 mole of $Ti(O-nC_4H_9)_4$, and the mixture was caused to react at 95° C. for 2 hours. The mixture was then allowed to cool to a temperature of 40° C., and the reaction was further conducted for 3 hours after 60 ml of methylhydrogenpolysiloxane (having a viscosity of 20 cSt) was introduced. The resulting solid product was washed with n-heptane.

Next, into a flask having been thoroughly purged with nitrogen, 100 ml of n-heptane purified in the same manner as above was introduced, and the solid product synthesized above was introduced in an amount of 0.2 mole based on Mg. Next, 0.45 mole of $SiCl_4$ mixed with 25 ml of n-heptane was then introduced into the flask at 20° C. over a period of 60 minutes, and the resulting mixture was caused to react at 70° C. for 3 hours. The mixture was then washed with n-heptane to give Component (A).

The titanium content measured with a portion of Component (A) was 2.79% by weight, and the particle diameter measured by the photo-extinction and sedimentation method was 15.8 μm.

[Blending of Components (A1) and (A2)/Synthesis of Catalyst Component (A)]

Into a flask having been thoroughly purged with nitrogen, 50 ml of thoroughly purified heptane was introduced, and 10 g of Component (A1) and 0.1 g of $TiO_2$ (manufactured by Nippon Aerosil Co.; average particle diameter of the primary particles: 0.02 μm, specific surface area: 55 $m^2$/g, average particle diameter, 0.3 μm; the average particle diameter was a particle diameter of particles formed by the agglomeration of the primary particles measured with a transmitting electron microscope) were added and the materials in the flask are blended by stirring at room temperature. After the stirring/blending was completed, heptane was removed, and the residue was dried to give Catalyst Component (A). Catalyst Component (A) thus obtained showed very good characteristics of an angle of repose of 38°, the fluidity of 3 mmφ and the bulk density of 0.54 g/cc.

The ratio of the particle diameter of Component (A2) to that of Component (A1) was 0.019, and the weight ratio of the amount of Component (A2) used to that of Component (A1) was 0.01.

<Comparative Example 1>

[Preparation of Catalyst Component (A)]

In the preparation of Catalyst Component (A) in Example 1, Component (A1) was used as a sole component for Catalyst Component (A). The product was found to have very poor characteristics of an angle of repose of 61°, no fluidity and a bulk density of 0.36 g/cc.

<Application Example 1>

An α-olefin was polymerized by the Catalyst Component of the present invention.
[Polymerization of propylene]

Into a stainless steel autoclave having an internal volume of 1.5 liter and provided with a stirrer and a temperature controlling device, 30 g of a thoroughly dehydrated and deoxygenated polymeric support which was particulate polyethylene having an average diameter of 500 μm, 125 mg of triethylaluminum, 18 mg of dicyclopentyldimethoxysilane and 20.7 mg of Catalyst Component (A) synthesized in Example 1 described above were introduced through a catalyst inlet tube having an internal diameter of 1.5 mm. Next, 300 ml of $H_2$ was introduced and temperature and pressure was raised to conduct polymerization under the conditions of the polymerization pressure of 7 $kg/cm^2$.G, the polymerization temperature of 75° and the polymerization period of 2 hours. After the polymerization was completed, the polymer thus formed was recovered in a yield of 66.3 g. The polymer was found to have an MFR of 21.4 (g/10 min) and a bulk density of 0.45 (g/cc). The evaluation of its stereoregularity (I.I.) with boiling heptane revealed 97.2% by weight.

After the polymerization was completed, no adhesion of the residual catalyst in the catalyst inlet tube nor the polymer adhesion in the polymerization vessel was observed. The procedures of catalyst introduction and polymerization in the same manner were repeated ten times, but no adhesion was observed in the catalyst inlet tube or in the polymerization vessel.

<Comparative Application Example 1>

Polymerization was carried out under the same conditions as was in the Application Example 1 except that Catalyst Component (A) synthesized in Comparative Example 1 was used in place of Catalyst Component (A) synthesized in Example 1, provided that Catalyst Component (A) was used in an amount of 20.7 mg. As a result, a polymer having an MFR of 20.8 (g/10 min) and a polymer bulk density of 0.42 (g/cc) was obtained in a yield of 64.1 g. In this connection, the adhesion of the residual catalyst in a small amount was observed in a catalyst inlet tube. When the procedures of catalyst introduction and polymerization were repeated in the same manner, the clogging of the catalyst inlet tube took place during the fifth run whereby no further polymerization was possible.

<Example 2>

[Preparation of Component (A1)]

Into a flask which had been thoroughly purged with nitrogen, 200 ml of dehydrated and deoxygenated n-heptane was introduced, followed by 0.4 mole of $MgCl_2$ and 0.8 mole of $Ti(O-nC_4H_9)_4$, and the mixture was caused to react at 95° C. for 2 hours. The mixture was then allowed to cool to a temperature of 40° C., and, upon addition thereof 48 ml of methylhydrogenpolysiloxane (having a viscosity of 20 cSt), the reaction was further conducted for 3 hours. The resulting solid product was washed with n-heptane.

Next, into a flask having been thoroughly purged with nitrogen, 50 ml of n-heptane purified in the same manner as above was introduced, and the solid product synthesized above was introduced in an amount of 0.24 mole based on Mg atom. 0.4 mole of $SiCl_4$ mixed with 25 ml of n-heptane was then introduced into the flask at 30° C. over a period of 30 minutes, and the resulting mixture was caused to react at 70° C. for 3 hours. The product obtained was washed with n-heptane. Then, 0.024 mole of phthalic chloride mixed with 25 ml of n-heptane was introduced at 70° C. over a period of 30 minutes, and the mixture was caused to react at 90° C. for 1 hour.

The product obtained was washed with n-heptane, and 10 ml of $SiCl_4$ was added for further reaction at 80° C. for 6 hours. The product obtained was thoroughly washed with n-heptane. The product obtained was found to have a titanium content of 1.24% by weight.

Into a flask having been thoroughly purged with nitrogen, 100 ml of thoroughly purified n-heptane was introduced, and 10 g of the solid product obtained above was introduced, followed by 2.4 ml of $(CH_3)_3CSi(CH_3)(OCH_3)_2$, 3.0 g of triethylaluminum and 15 g of divinylbenzene for contact at 30° C. for 2 hours.

The product obtained was washed thoroughly with n-heptane to give Component (A1). In this connection, the divinylbenzene was polymerized in an amount of 1.4 g/g of the solid product (excluding the amount of the divinylbenzene polymerized) and the average particle diameter of Component (A1) was 27.8 μm.
[Blending of Components (A1) and (A2)/Synthesis of Catalyst Component (A)]

Into a 100 ml sample bottle having been thoroughly purged with nitrogen, 10 g of Component (A1) and 0.01 g of $TiO_2$ which was the same as the one used in Example 1 were added and blended on a shaker for 5 minutes. Catalyst Component (A) thus obtained had very good granulometric characteristics of an angle of repose of 37°, a fluidity of 3 mmφ and a bulk density of 0.58 g/cc. The ratio of the particle diameter of Component (A2) to that of Component (A1) was 0.011, and the weight ratio of the amount of Component (A2) used to that of Component (A1) was 0.01.

<Comparative Example 2>

[Preparation of Catalyst Component (A)]

In the preparation of Catalyst Component (A) in Example 2, Component (A1) was used as a sole component for Catalyst Component (A). The product was found to have very poor characteristics of an angle of repose of 57°, a fluidity of 12 mmφ and a bulk density of 0.39 g/cc.

<Examples 3 to 6>

Catalyst Component (A) was synthesized in the same manner as in Example 2 except that the amount of $TiO_2$ added as Component (A2) was changed into the amounts shown in Table 1 and Components (A1) and (A2) were blended in a vibration mill for 1 hour. The results obtained are shown in Table 1.

TABLE 1

| Example | Amount of $TiO_2$ added (Weight ratio of Components (A2)/(A1)) | Properties of Component (A) | | |
|---|---|---|---|---|
| | | Angle of repose (°) | Fluidity | Bulk density (g/cm$^3$) |
| Example 3 | 0.03 | 36 | 3 mmφ | 0.60 |
| Example 4 | 0.10 | 35 | 3 mmφ | 0.63 |
| Example 5 | 0.20 | 33 | 3 mmφ | 0.66 |
| Example 6 | 0.50 | 37 | 3 mmφ | 0.59 |
| Comp. Example 2 | 0 | 57 | no fluidity | 0.39 |

<Example 7>

Preparation of Component (A1)]

Into a 500 ml flask having been purged with thoroughly purified nitrogen, 20 g of $Mg(OC_2H_5)_2$, 100 ml of n-heptane and 60 ml of $TiCl_4$ were introduced. Then, the temperature was raised to 70° C. and 7.6 ml of di-n-octyl phthalate was added and the mixture was caused to react for 3 hours at a temperature raised up to 100° C. After the reaction, the product obtained was washed thoroughly with n-heptane. Next, 100 ml of $TiCl_4$ was added, and the mixture was caused to react at 110° C. for 3 hours. After the reaction, the reaction product was thoroughly washed with n-heptane to give a product as Component (A1). The product was found to have a titanium content of 2.56% by weight, and the average particle diameter was 11.6 μm. The product had an angle of repose of 63°, no fluidity and a bulk density of 0.33 (g/cc).

[Blending of Components (A1) and (A2)]

To a 100 ml sample bottle having been thoroughly purged with nitrogen were added 10 g of the aforementioned Component (A1) and 0.75 g of $TiO_2$ which was the same as that used in Example 1, and the mixture was blended on a shaker for 5 hours. Catalyst Component (A) obtained was found to have an angle of repose of 41°, a fluidity of 5 mmφ and a bulk density of 0.46 g/cc.

<Example 8>

[Preparation of Component (A1)]

Into a flask having been thoroughly purged with nitrogen was introduced 100 ml of dehydrated and deoxygenated n-heptane, followed by 0.1 mole of $MgCl_2$ and 0.2 mole of $Ti(O-n-C_4H_9)_4$, and the mixture was caused to react at 95° C. for 2 hours. The reaction mixture was then allowed to cool to a temperature of 40° C. and, upon addition thereto of 12 ml of methylhydrogenpolysiloxane (having a viscosity of 20 cSt), reacted for 3 hours. The resulting solid product was washed with n-heptane.

Into a flask having been thoroughly purged with nitrogen was then introduced the solid product prepared above in an amount of 0.06 mole based on the Mg atom, followed by n-heptane to a total volume of 200 cc. 6.5 mmole of ethylaluminum dichloride was added dropwise over a period of 20 minutes at 25° C., followed by 0.2 mole of $SiCl_4$ over a period of 20 minutes, and the mixture was caused to react for 3 hours. Then, the temperature was raised to 90° C., and the mixture was caused to react for further 3 hours. The reaction product was thoroughly washed with n-heptane.

Next, 0.033 mole of ethylaluminum dichloride (15% by weight heptane solution) was added dropwise, and the mixture was caused to react at 35° C. for 2 hours. The reaction product was thoroughly washed with n-heptane and dried in vacuo. The product was found to carry Ti in 4.70% by weight.

Into a 1.5 liter stainless steel autoclave equipped with stirring blades, having been thoroughly purged with nitrogen were added 500 ml of thoroughly purified n-heptane and 8 g of Catalyst Component obtained above, and 1.6 g of triisobutylaluminum was further introduced. Hydrogen was then introduced to a pressure of 1.5 kg/cm$^2$.G, ethylene was introduced at 80° C. at a rate of 0.43 liter/min for 1 hour.

The product was thoroughly washed with n-heptane and dried in vacuo to give a product as Component (A1). The amount of ethylene polymerized was 3.7 g/g of the solid component.

Component (A1) was found to have an average particle diameter of 35.7 μm.

[Blending of Components (A1) and (A2)/Synthesis of Component (A)]

Into a 100 ml sample bottle having been thoroughly purged with nitrogen were added 10 g of Component (A1) obtained above and 0.2 g of $TiO_2$ which was the same as the one used in Example 1 and the mixture was blended on a shaker for 10 minutes. Catalyst Component (A) thus obtained was found to have very good characteristics of an angle of repose of 49°, a fluidity of 5 mmφ and a bulk density of 0.52 g/cc.

<Comparative Example 3>

[Synthesis of Catalyst Component (A)]

In the synthesis of Catalyst Component (A) in Example 8, Component (A1) was used as a sole component for Component (A). The product was found to have very poor characteristics of an angle of repose of 65°, no fluidity and a bulk density of 0.31 g/cc.

<Application Example 2>

Ethylene was polymerized by Catalyst Component of the present invention.

[Polymerization of ethylene]

Into a stainless steel autoclave having an internal volume of 1.5 liter and provided with a stirrer and a temperature controlling device, 60 g of a thoroughly dehydrated and deoxygenated polymeric carrier (polyethylene having an average diameter of 500 μm), 100 mg of triethylaluminum as Catalyst Component (B), 120 mg of Catalyst Component (A) synthesized in Example 8 described above were introduced through a catalyst inlet tube having an internal diameter of 1.5 mm. 1.0 ml of 1-hexene and hydrogen in a pressure of 0.1 kg/cm$^2$.G were then introduced, followed by ethylene to a total pressure of 2.9 kg/cm$^2$.G, and polymerization was conducted at 85° C. for 2 hours. As a result, a polymer was obtained in a yield of 106.0 g.

The polymer thus obtained was found to have molecular weights of Mn=$0.670\times10^5$ and Mw=$0.357\times10^6$ and a polymer bulk density of 0.332.

No adhesion in the catalyst inlet tube nor in the polymerization vessel was observed. No coarse polymer particles were observed in the polymerization vessel.

The procedures of catalyst introduction and polymerization in the same manner were repeated ten times, but no adhesion in the catalyst inlet tube nor in the polymerization vessel was observed.

<Comparative Application Example 2>

Polymerization was carried out under the same conditions as was in Application Example 2 except that Catalyst Component (A) used in Comparative Example 3 was used, provided that Catalyst Component (A) was used in an amount of 137 mg. As a result, a polymer was obtained in a yield of 85.3 g. The polymer thus obtained was found to have molecular weights of Mn=$0.600\times10^5$ and Mw=$0.325\times10^6$ and a polymer bulk density of 0.287 g/cc.

Adhesion of the residual catalyst was observed in a catalyst inlet tube, and a small amount of coarse polymer particles was observed in the polymerization vessel. When the procedures of catalyst introduction and polymerization were repeated in the same manner, the clogging of the catalyst inlet tube took place during the fourth run whereby no further polymerization was possible.

<Examples 9–12 and Comparative Example 4>

Catalyst Component (A) was prepared in the same manner as in Example 8 except that Component (A2) in Example 8 was replaced by the ones shown in Table 2. The results obtained are shown in Table 2.

Into a flask having been thoroughly purged with nitrogen, the solid product synthesized above was introduced in an amount of 60 mmole based on the Mg atom, and n-heptane was added to a total volume of 200 cc. 22 mmole of $SiCl_4$ was then added dropwise at 25° C. over a period of 15 minutes. Further, 85 mmole of $TiCl_4$ was added dropwise at 25° C. over a period of 30 minutes, and the mixture was caused to react for 3 hours at a temperature raised to 50° C.

The mixture was then washed thoroughly with n-heptane and dried in vacuo to give a product Catalyst Component (A). The product was found to have a Ti content of 11.9% by weight and an average particle diameter of 17.3 μm.

The product was found to have an angle of repose of 62°, a fluidity of 12 mmφ and a bulk density of 0.50 g/cc.
[Blending of Components (A1) and (A2)]

Experiment was conducted in the same manner as in Example 8 except that Component (A1) obtained above was used.

Catalyst Component (A) thus obtained was found to have very good characteristics of an angle of repose of 48°, a fluidity of 3 mmφ and a bulk density of 0.57 g/cc.

<Example 14>

[Preparation of Component (A1)]

Into a stainless-steel pot was added stainless steel balls of a 12.7 mm diameter in an amount of 900 ml, and then under nitrogen atmosphere 40 g of titanium trichloride [$TiCl_3(AA)$] which had been prepared by reduction with metallic aluminum and ground over 40 hours, 130 g of anhydrous magnesium chloride, 15 g of silicon tetrachloride and 15 g of methyl methacrylate, followed by milling by a vibration mill under conditions of vibration width of 5 mm and a motor revolution of 1,700 rpm over 80 hours.

TABLE 2

| Example | Component (A2) Compound | Source | Average particle diameter (μm) | Angle of repose (°) | Fluidity | Bulk density (g/cm³) |
| --- | --- | --- | --- | --- | --- | --- |
| Example 9 | $ZrO_2$ | Nippon Aerosil | Primary particle diameter: 0.04 Average particle diameter: 0.2 | 50 | 5 mmφ | 0.53 |
| Example 10 | $Al_2O_3$ | Nippon Aerosil | Primary particle diameter: 0.01 Average particle diameter: 0.2 | 55 | 8 mmφ | 0.42 |
| Example 11 | $SiO_2$ | Nippon Aerosil | Primary particle diameter: 0.01 Average particle diameter: 0.2 | 56 | 8 mmφ | 0.40 |
| Example 12 | Zeolite | Nippon Kagaku CS100 | 2.1 | 58 | 12 mmφ | 0.36 |
| Comp. Example 4 | $SiO_2$ | Devison | 39 | 65 | no fluidity | 0.31 |

<Example 13>

[Preparation of Component (A1)]

Into a flask which had been thoroughly purged with nitrogen, was introduced 100 ml of dehydrated and deoxygenated n-heptane, followed by 0.1 mole of $MgCl_2$ and 0.2 mole of $Ti(O-nC_4H_9)_4$, and the mixture was caused to react at 95° C. for 2 hours. The mixture was then allowed to cool to a temperature of 40° C., and, upon introduction of 12 ml of methylhydropolysiloxane (having a viscosity of 20 cSt), the reaction was further conducted for 3 hours. The resulting solid product was washed with n-heptane.

The product thus obtained was found to carry Ti in an amount of 4.80% by weight.

Into a stainless-steel autoclave equipped with stirring blades of a capacity of 1.5 liters purged thoroughly with nitrogen were added 500 ml of n-heptane thoroughly purified and 5.3 g of the solid catalyst component obtained in the above, and then 0.8 g of triethylaluminum. Hydrogen was then introduced until the pressure was 1.2 kg/cm².G followed by introduction of ethylene at 40° C. at a rate of 0.28 liter/minute for 1 hour.

The product obtained was washed thoroughly with n-heptane and dried in vacuo to prepare Component (A1), which was found to contain ethylene polymerized in an amount of 4.0 g/g solid component and have an average particle size of 85 microns.

[Admixing of Component (A1) with Component (A2)/ Preparation of Component (A)]

Into a sample bottle of a capacity of 100 ml purged thoroughly with nitrogen were added 10 g of Component (A1) obtained in the above, and 0.2 g of $TiO_2$ used in Example 1, followed by blending on a shaker for 10 minutes for admixing.

The product thus obtained, Component (A), was found to have highly improved characteristics of an angle of repose of 41°, a fluidity of 3 mmφ and a bulk density of 0.29 g/cc.

<Comparative Example 5>

The procedure as set forth in Example 14 was followed in the synthesis of Component (A) except for the use of Component (A1) as a sole component for Catalyst Component (A).

The product was found to have very poor characteristics of an angle of repose of 50°, a fluidity of 8 mmφ and a bulk density of 0.23 g/cc.

<Example 15>

[Preparation of Component (A1)]

Into a flask thoroughly purged with nitrogen was added 4.8 g of metallic magnesium, followed by 0.20 mol of n-butylchloride and 100 ml of n-butylether dropped into it at 50° C. After reaction for 2 hours, 1.5 mmol/ml of n-butylmagnesium chloride was synthesized.

The supernatant of the product in an amount of 100 ml (0.15 mol) was transferred to another flask thoroughly purged with nitrogen, 0.15 mol of $SiCl_4$ was dropped into it at 25° C. under stirring over 2 hours, and was reacted at 50° C. for further 3 hours. The product was washed thoroughly with n-heptane.

$TiCl_4$ in an amount of 50 ml was then added to the product obtained and reacted at 90° C. for 3 hours. The product thus obtained was washed thoroughly with n-heptane to prepare a solid catalyst component, which was found to carry Ti in an amount of 1.89% by weight.

Into a stainless-steel autoclave equipped with stirring blades of a capacity of 1.5 liters purged thoroughly with nitrogen were added 500 ml of n-heptane thoroughly purified and 5 g of the solid catalyst component obtained in the above, and then 0.75 g of triethylaluminum. Hydrogen was then introduced until the pressure was 0.1 kg/cm².G followed by introduction of ethylene at 40° C. at a rate of 0.33 liter/minute for 2 hour.

The product obtained was washed thoroughly with n-heptane and dried in vacuo to prepare Component (A1), which was found to contain ethylene polymerized in an amount of 9.6 g/g solid component and have an average particle size of 21.1 microns.

[Admixing of Component (A1) with Component (A2)/ Preparation of Component (A)]

Into a sample bottle of a capacity of 100 ml purged thoroughly with nitrogen were added 10 g of Component (A1) obtained in the above, 0.1 g of $TiO_2$ used in Example 1 and 0.1 g of alumina-C used in Example 10, followed by blending on a shaker for 10 minutes for admixing.

The product thus obtained, Component (A), was found to have highly improved characteristics of an angle of repose of 45°, a fluidity of 3 mmφ and a bulk density of 0.40 g/cc.

<Comparative Example 6>

The procedure as set forth in Example 15 was followed in the synthesis of Component (A) except for the use of Component (A1) as a sole component for Catalyst Component (A).

The product was found to have very poor characteristics of an angle of repose of 60°, a fluidity of 12 mmφ and a bulk density of 0.29 g/cc.

The catalyst component of the present invention has the improved powder properties in such as fluidity, angle of repose or adhesion. When an olefin is polymerized with the catalyst component of the present invention combined with an organoaluminum compound, industrial production techniques in which various operation problems for producing olefin polymers such as the clogging of the catalyst inlet tube during the introduction of the catalyst, polymer adhesion involved in the catalyst adhesion in a polymerization vessel or the formation of coarse particles have been eliminated can be provided.

What is claimed is:

1. A catalyst component for olefin polymerization which comprises an intimate mixture of:

Component (A1) which is a solid component for Ziegler catalysts comprising titanium, magnesium and a halogen as essential components in a particulate form; and component (A2) which is a compound selected from the group consisting of inorganic oxides, inorganic carbonates, inorganic sulfates and physical or chemical mixtures thereof in a particulate form;

wherein Component (A2) is employed in a weight ratio to Component (A1) from 0.001 to 0.5 and has an average particle diameter smaller than that of Component (A1), and wherein the ratio of the average particle diameter of Component (A2) to that of Component (A1) is in the range of from 0.0001 to 0.5 and wherein the sticky particles of Component (A1) are coated with the particles of Component (A2) in order to avoid clogging of the polymerization bed.

2. The catalyst component as claimed in claim 1, wherein Component (A1) is a product prepared by a method selected from the group of:

(i) a method in which a solid component obtained by contacting a magnesium halide with a titanium tetraalkoxide and a polymeric silicon compound is contacted with a titanium halide compound and/or a silicon halide compound, the polymeric silicon compound represented by the formula

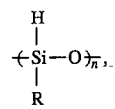

wherein R is a hydrocarbyl group having about 1 to 10 carbon atoms, n is a polymerization degree such that the viscosity of the polymeric silicon compound may be 1 to 100 centistokes;

(ii) a method in which a magnesium compound is dissolved in a titanium tetraalkoxide and an electron donor, and the solid component precipitated from the solution upon addition thereto of a halogenating agent or a titanium halide compound is contacted with a titanium compound; and (iii) a method in which a magnesium dihalide and a titanium tetraalkoxide and/or a polymer at a titanium tetraalkoxide are contacted, and subsequently with the polymeric silicon compound.

3. The process as claimed in claim 2, wherein the halogenating agent is selected from the group of silicon halides, aluminum halides and halogen compounds of phosphorus.

4. The catalyst component as claimed in claim 1, wherein Component (A2) is selected from the group consisting of zeolite, alumina, titania, silica and zirconia.

5. The catalyst component as claimed in claim 4, wherein Component (A2) is titania.

6. The catalyst component as claimed in claim 4, wherein Component (A2) is zirconia.

7. The catalyst component as claimed in claim 1, wherein Component (A2) has an average particle size such that an average particle diameter of the primary particles is no larger than 1 μm.

8. The catalyst component as claimed in claim 7, wherein Component (A2) has an average particle size such that an average particle diameter of the primary particles is no larger than 0.1 μm.

9. The catalyst component as claimed in claim 1, wherein said ratio is in the range of from 0.0005 to 0.1.

10. The catalyst component as claimed in claim 1, wherein the weight ratio of Component (A2) to Component (A1) is in the range from 0.005 to 0.1.

11. The catalyst component as claimed in claim 1, wherein Component (A1) is one which has undergone a preliminary polymerization.

12. A catalyst for olefin polymerization comprising a combination of Catalyst Component as claimed in claim 1 and an organoaluminum compound.

13. A process for production of an olefin polymer, which comprises:

contacting an olefin with a catalyst for olefin polymerization comprising Component (A1) which is a solid component for Ziegler catalysts comprising titanium, magnesium and a halogen as essential components in a particulate form, Component (A2) which is a compound selected from the group consisting of inorganic oxides, inorganic carbonates, inorganic sulfates and physical or chemical mixtures thereof in a particulate form, and an organoaluminum compound, wherein Component (A2) is employed in a weight ratio to Component (A1) from 0.001 to 0.5 and has an average particle diameter smaller than that of Component (A1), and wherein the ratio of the average particle diameter of Component (A2) to that of Component (A1) is in the range of from 0.0001 to 0.5, and coating the sticky particles of Component (A1) with the particles of Component (A2) in order to avoid clogging of the polymerization bed, and polymerizing said olefin.

* * * * *